(12) United States Patent
Ryu et al.

(10) Patent No.: US 11,655,517 B2
(45) Date of Patent: *May 23, 2023

(54) ULTRAHIGH-STRENGTH AND HIGH-DUCTILITY STEEL SHEET HAVING EXCELLENT COLD FORMABILITY

(71) Applicant: POSCO CO., LTD, Pohang-si (KR)

(72) Inventors: Joo-Hyun Ryu, Gwangyang-si (KR); Kyoo-Young Lee, Gwangyang-si (KR); Sea-Woong Lee, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 55 days.

This patent is subject to a terminal disclaimer.

(21) Appl. No.: 16/761,953

(22) PCT Filed: Sep. 17, 2018

(86) PCT No.: PCT/KR2018/010907
§ 371 (c)(1),
(2) Date: May 6, 2020

(87) PCT Pub. No.: WO2019/093650
PCT Pub. Date: May 16, 2019

(65) Prior Publication Data
US 2021/0180150 A1    Jun. 17, 2021

(30) Foreign Application Priority Data

Nov. 8, 2017  (KR) .................. 10-2017-0148175

(51) Int. Cl.
*C23C 2/06* (2006.01)
*C23C 2/40* (2006.01)
(Continued)

(52) U.S. Cl.
CPC ............... *C21D 9/46* (2013.01); *B32B 15/01* (2013.01); *B32B 15/012* (2013.01); *B32B 15/013* (2013.01); *B32B 15/04* (2013.01); *B32B 15/043* (2013.01); *B32B 15/18* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C23C 2/06* (2013.01); *C23C 2/12* (2013.01); *C23C 2/26* (2013.01); *C23C 2/28* (2013.01); *C23C 2/40* (2013.01); *C23C 28/021* (2013.01); *C23C 28/023* (2013.01); *C23C 28/025* (2013.01); *C23C 28/3225* (2013.01);
(Continued)

(58) Field of Classification Search
CPC ..... B32B 15/013; B32B 15/012; B32B 15/01; B32B 15/04; B32B 15/043; B32B 15/18; C21D 2211/001; C21D 2211/004; C21D 2211/008; C21D 6/005; C21D 6/008; C21D 8/0205; C21D 8/0226; C21D 8/0263; C21D 8/0273; C22C 38/001; C22C 38/002; C22C 38/02; C22C 38/04; C22C 38/06; C22C 38/12; C22C 38/14; C22C 38/18; C22C 38/20; C22C 38/22; C22C 38/24; C22C 38/26; C22C 38/28; C22C 38/38; C22C 38/40; C22C 38/42; C22C 38/44; C22C 38/46; C22C 38/48; C22C 38/50; C23C 30/00; C23C 30/005; C23C 28/025; C23C 28/3225; C23C 28/023; C23C 28/021; C23C 2/06; C23C 2/28; C23C 2/40; C23C 2/12; C23C 2/26; Y02P 10/20; Y10T 428/26; Y10T 428/12951; Y10T 428/12958; Y10T 428/12965; Y10T 428/12972; Y10T 428/12979; Y10T 428/12757; Y10T 428/12799

See application file for complete search history.

(56) References Cited

U.S. PATENT DOCUMENTS

2014/0360632 A1    12/2014   Hasegawa et al.
2017/0051378 A1    2/2017    Lee et al.
(Continued)

FOREIGN PATENT DOCUMENTS

CN    101660097 A    3/2010
CN    102912219 A    2/2013
(Continued)

OTHER PUBLICATIONS

Machine Translation, JP 6123966B1, May 2017. (Year: 2017).*
(Continued)

*Primary Examiner* — Michael E. La Villa
(74) *Attorney, Agent, or Firm* — Morgan, Lewis & Bockius LLP

(57) ABSTRACT

The present invention relates to an automotive steel sheet and, more specifically, provides: an ultrahigh-strength and high-ductility steel sheet ensuring ultrahigh strength and high ductility and, simultaneously, having excellent cold formability due to a high yield strength ratio, and improved collision characteristics.

7 Claims, 2 Drawing Sheets

(51) Int. Cl.
| | |
|---|---|
| C22C 38/14 | (2006.01) |
| C22C 38/12 | (2006.01) |
| C22C 38/06 | (2006.01) |
| C22C 38/04 | (2006.01) |
| C22C 38/02 | (2006.01) |
| C22C 38/00 | (2006.01) |
| B32B 15/01 | (2006.01) |
| C21D 9/46 | (2006.01) |
| C21D 8/02 | (2006.01) |
| C21D 6/00 | (2006.01) |
| C23C 2/28 | (2006.01) |
| C22C 38/26 | (2006.01) |
| C22C 38/28 | (2006.01) |
| C23C 30/00 | (2006.01) |
| B32B 15/04 | (2006.01) |
| B32B 15/18 | (2006.01) |
| C22C 38/18 | (2006.01) |
| C22C 38/24 | (2006.01) |
| C23C 28/02 | (2006.01) |
| C22C 38/42 | (2006.01) |
| C23C 2/26 | (2006.01) |
| C22C 38/50 | (2006.01) |
| C22C 38/20 | (2006.01) |
| C22C 38/46 | (2006.01) |
| C22C 38/38 | (2006.01) |
| C22C 38/44 | (2006.01) |
| C22C 38/22 | (2006.01) |
| C22C 38/40 | (2006.01) |
| C23C 2/12 | (2006.01) |
| C23C 28/00 | (2006.01) |
| C22C 38/48 | (2006.01) |

(52) U.S. Cl.
CPC ............ *C23C 30/00* (2013.01); *C23C 30/005* (2013.01); *C21D 2211/001* (2013.01); *C21D 2211/004* (2013.01); *C21D 2211/008* (2013.01); *Y02P 10/20* (2015.11); *Y10T 428/12757* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/26* (2015.01)

(56) References Cited

U.S. PATENT DOCUMENTS

| | | | |
|---|---|---|---|
| 2017/0145535 | A1 | 5/2017 | Fojer et al. |
| 2019/0211427 | A1* | 7/2019 | Sano ................... C22C 38/00 |
| 2019/0233910 | A1 | 8/2019 | Ryu et al. |
| 2019/0271064 | A1 | 9/2019 | Zhang et al. |
| 2020/0248281 | A1 | 8/2020 | Lee et al. |

FOREIGN PATENT DOCUMENTS

| | | |
|---|---|---|
| CN | 105648317 A | 6/2016 |
| CN | 106244918 A | 12/2016 |
| CN | 107075649 A | 8/2017 |
| EP | 2554699 A1 | 2/2013 |
| EP | 3372703 A1 | 9/2018 |
| JP | 2003138345 A | 5/2003 |
| JP | 6123966 B1 | 5/2017 |
| KR | 10-2013-0138039 A | 12/2013 |
| KR | 10-2014-0075789 A | 6/2014 |
| KR | 10-2016-0078839 A | 7/2016 |
| KR | 10-1639919 B1 | 7/2016 |
| KR | 10-1677396 B1 | 11/2016 |
| KR | 10-2017-0027745 A | 3/2017 |
| KR | 10-2017-0075853 A | 7/2017 |
| KR | 10-1839235 B1 | 3/2018 |
| WO | 2011/122237 A1 | 10/2011 |
| WO | 2017/078278 A1 | 5/2017 |

OTHER PUBLICATIONS

Machine Translation, Ryu et al., KR 101839235B1, Mar. 2018. (Year: 2018).*
International Search Report dated Dec. 21, 2018 issued in International Patent Application No. PCT/KR2018/010907 (with English translation).
Chinese Office Action dated Mar. 19, 2021 issued in Chinese Patent Application No. 201880072833.5.
Japanese Office Action dated May 18, 2021 issued in Japanese Patent Application No. 2020-524510.

* cited by examiner

【FIG. 1】
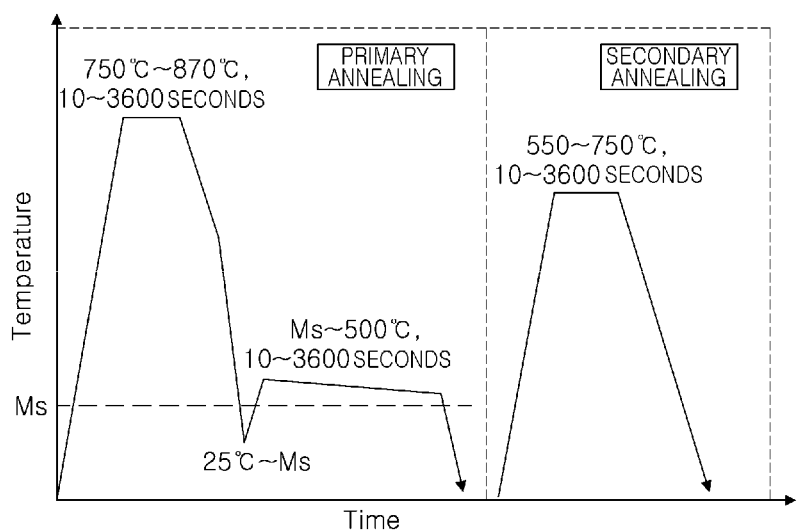
【FIG. 2】
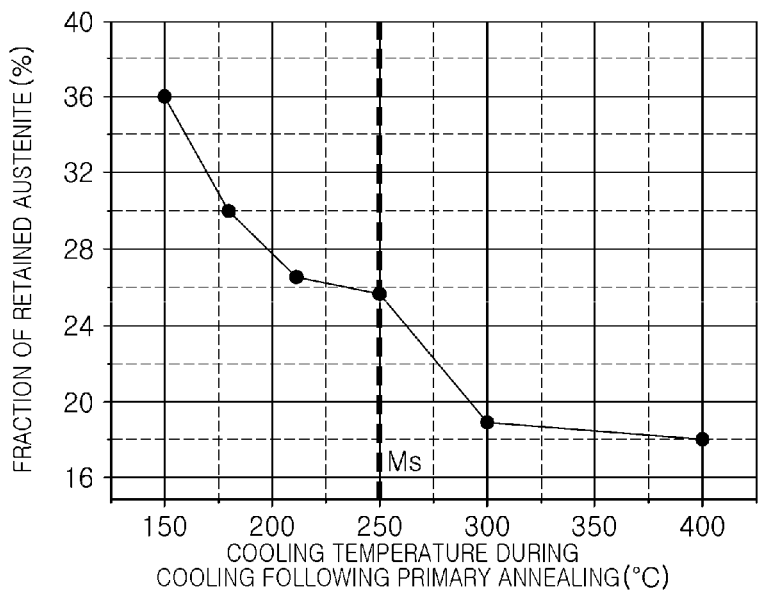

[FIG. 3]
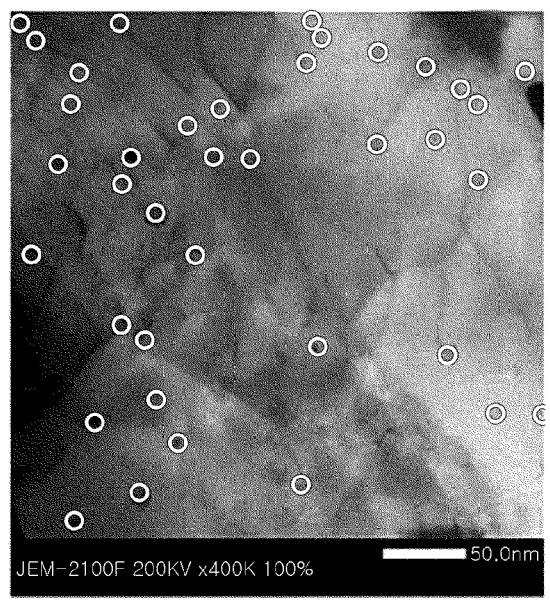
(a)
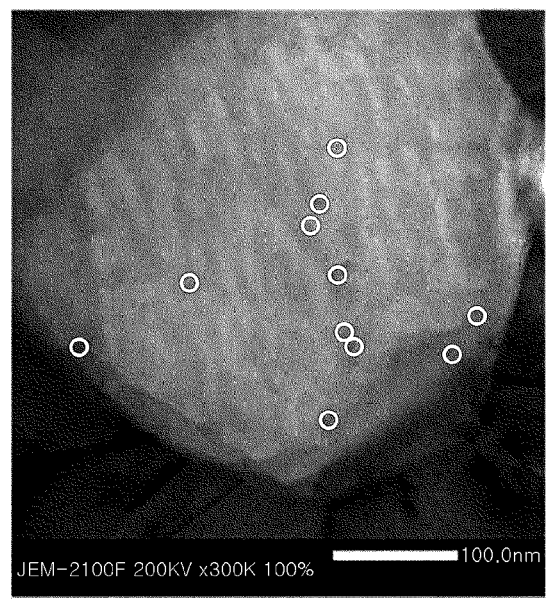
(b)

ULTRAHIGH-STRENGTH AND HIGH-DUCTILITY STEEL SHEET HAVING EXCELLENT COLD FORMABILITY

CROSS-REFERENCE OF RELATED APPLICATIONS

This application is the U.S. National Phase under 35 U.S.C. § 371 of International Patent Application No. PCT/KR2018/010907, filed on Sep. 17, 2018, which in turn claims the benefit of Korean Application No. 10-2017-0148175, filed on Nov. 8, 2017, the entire disclosures of which applications are incorporated by reference herein.

TECHNICAL FIELD

The present disclosure relates to a steel sheet for automobiles, and more particularly, to an ultrahigh-strength and high-ductility steel sheet having excellent cold formability and a method for manufacturing the same.

BACKGROUND ART

To ensure the safety of passengers in the event of an automobile collision, safety regulations of automobiles are being tightened. To this end, a steel sheet for automobiles should have high strength or large thickness. However, to improve fuel efficiency of automobiles, which are being strengthened due to environmental issues, automobile manufacturers are continuously demanding a reduction in weight of a car body.

To secure both collision safety and reductions in weight of automobiles, a steel sheet should have high strength. However, when strength of a steel sheet is increased, ductility of the steel sheet generally tends to be decreased. Accordingly, there is a limitation in using high-strength steel in components required to have formability.

As an effort to overcome such disadvantages of high-strength steel, Hot-press formed (HPF) steel has been developed. A component is formed at a high temperature with excellent formability, and is then rapidly cooled to room temperature to secure a low-temperature structure. Ultimately, high yield strength and high yield strength of hot-press forming steel are implemented. However, there is still an issue in which the cost of automobile components may be increased due to the requirement for investments in hot press forming equipment by automobile component manufacturers and an increase in processing costs due to a high-temperature heat treatment.

Therefore, research into steel having high strength and excellent elongation, suitable for cold press forming, has continuously been performed.

As an example, Patent Document 1 proposed an ultrahigh tensile strength steel sheet having tensile strength of about 700 MPa to 900 MPa and high ductility of about 50% to 90% by adding carbon (C) and manganese (Mn) in amounts of 0.5% to 1.5% and 10% to 25%, respectively.

Patent Document 2 proposed an ultrahigh-strength steel sheet having excellent collision characteristics while having tensile strength of 1300 MPa or more and yield strength of 1000 MPa or more by adding C and Mn in amounts of 0.4% to 0.7% and 12% to 24%, respectively.

However, since the steel sheet of Patent Document 1 has lower yield strength and tensile strength than hot-press forming steel to deteriorate collision characteristics, there is a limitation in application of the steel sheet of Patent Document 1 when it is used as a structural member for automobiles. In addition, since the steel sheet of Patent Document 2 has low elongation of about 10%, there is a limitation in applying the steel sheet of Patent Document 2 to a component having a complicated shape when it is cold-press formed. In addition, since the steel sheet of Patent Document 2 secures high strength through re-rolling following annealing, manufacturing costs are disadvantageously increased by an additional process.

Accordingly, there is demand for development of an ultrahigh-strength and high-ductility steel sheet having excellent cold formability while being capable of replacing an existing hot-press forming steel.

(Patent Document 1) International Patent Publication No. WO2011-122237

(Patent Document 2) Korean Patent Publication No. 10-2013-0138039

DISCLOSURE

Technical Problem

An aspect of the present disclosure is to provide an ultrahigh-strength and high-ductility steel sheet having excellent cold formability due to a high yield strength ratio and improved collision characteristics while securing ultrahigh strength and high ductility.

Technical Solution

According to an aspect of the present disclosure, an ultrahigh-strength and high-ductility steel sheet having excellent cold formability includes, by weight percentage (wt %), carbon (C): 0.1% to 0.3%, manganese (Mn): 6% to 10%, phosphorus (P): 0.05% or less, sulfur (S): 0.02% or less, nitrogen (N): 0.02% or less, aluminum (Al): 0.5% or less (excluding 0%), at least one selected from the group consisting of titanium (Ti): 0.1% or less, niobium (Nb): 0.1% or less, vanadium (V): 0.2% or less, and molybdenum (Mo): 1% or less, a remainder of iron (Fe), and other unavoidable impurities. A microstructure of the steel sheet comprises retained austenite having a volume fraction of 20% or more and annealed martensite having a volume fraction of 60% or more, and the steel sheet contains $10^{13}/m^2$ or more precipitates, each having a size of 30 nm or less.

According to another aspect of the present disclosure, a method for manufacturing an ultrahigh-strength and high-ductility steel sheet having excellent cold formability includes: reheating a steel slab having the above-mentioned alloy composition at a temperature within a range of 1050° C. to 1300° C.; finish hot-rolling the reheated steel slab at a temperature within a range of 800° C. to 1000° C. to manufacture a hot-rolled steel sheet; coiling the hot-rolled steel sheet at a temperature within a range of 50° C. to 750° C.; pickling and cold rolling the coiled hot-rolled steel sheet to manufacture a cold-rolled steel sheet; performing a primary annealing process in which the cold-rolled steel sheet is maintained at a temperature within a range of 750° C. to 870° C. for 10 seconds to 3600 seconds, is then cooled from a room temperature to a martensitic transformation initiation temperature (Ms), is then reheated at a temperature within a range of MS to 500° C. and maintained for 10 seconds to 3600 seconds, and is then cooled to the room temperature; and performing a secondary annealing process in which the primarily annealed steel sheet is maintained at a temperature within a range of 550° C. to 750° C. for 10 seconds to 3600 seconds and is then cooled.

Advantageous Effects

According to the present disclosure, an ultrahigh-strength steel sheet, capable of satisfying both formability and collision safety required for a cold-press forming steel sheet, may be provided.

Since the ultrahigh-strength steel sheet may replace an existing hot-press forming steel sheet, manufacturing costs may be reduced.

DESCRIPTION OF DRAWINGS

FIG. 1 illustrates an example of an annealing process according to an embodiment of the present disclosure.

FIG. 2 is a graph showing a fraction of retained austenite depending on a cooling temperature after annealing when performing primary annealing according to an embodiment of the present disclosure.

FIG. 3 is an image of an ultimate microstructure of Inventive Example 13 according to an embodiment of the present disclosure.

BEST MODE FOR INVENTION

The present inventors have conducted intensive research to develop a steel sheet suitable for cold press forming, capable of replacing an existing steel sheet for hot press forming, having a mechanical properties equal to or higher than the existing steel sheet, and reducing manufacturing costs. As a result, it has been found that a steel sheet having excellent mechanical properties and microstructure suitable for cold press forming may be provided by optimizing component compositions and manufacturing conditions of steel, thereby completing the present disclosure.

Hereinafter, the present disclosure will be described in detail.

An ultrahigh-strength and high-ductility steel sheet having excellent cold formability according to an aspect of the present disclosure includes, by weight percentage (wt %), in detail, carbon (C): 0.1% to 0.3%, manganese (Mn): 6% to 10%, phosphorus (P): 0.05% or less, sulfur (S): 0.02% or less, nitrogen (N): 0.02% or less, aluminum (Al): 0.5% or less (excluding 0%), and at least one selected from the group consisting of titanium (Ti): 0.1% or less, niobium (Nb): 0.1% or less, vanadium (V): 0.2% or less, and molybdenum (Mo): 1% or less.

Hereinafter, reasons for controlling alloying components of the ultrahigh-strength steel sheet provided by the present disclosure will be described in detail. In this case, unless otherwise specified, the content of each component means weight percentage (wt %).

C: 0.1% to 0.3%

Carbon (C) is an element effective to strengthen steel. In the present disclosure, carbon (C) is added to stabilize austenite and to secure strength.

In detail, C is added in an amount of 0.1% or more to obtain the above-described effect. However, when the content of carbon (C) is greater than 0.3%, weldability may be deteriorated.

Therefore, in the present disclosure, the content of carbon (C) is controlled to, in detail, 0.1% to 0.3%. More advantageously, the content of carbon (C) may be controlled to 0.12% to 0.20%.

Mn: 6% to 10%

Manganese (Mn) is an element effective to form and stabilize retained austenite while suppressing transformation of ferrite.

When the content of manganese (Mn) is less than 6%, stability of the retained austenite is insufficient, and thus, mechanical properties are deteriorated. Meanwhile, when the content of manganese (Mn) is greater than 10%, alloying costs are increased and weldability is deteriorated. Therefore, the above contents of manganese (Mn) are not preferable.

As a result, in the present invention, the content of manganese (Mn) is controlled to, in detail, 6% to 10%. More advantageously, the content of manganese (Mn) may be controlled to 7% to 9%.

P: 0.05% or Less

Phosphorus (P) is an element having a solid-solution strengthening effect. However, when a content of phosphorus (P) is greater than 0.05%, there is an increasing risk that weldability is decreased and brittleness of steel occurs.

Therefore, in the present disclosure, the content of phosphorus (P) is controlled to, in detail, 0.05% or less and may be controlled to, in further detail, 0.02% or less. However, 0% is excluded in consideration of a decrease in productivity during steelmaking.

S: 0.02% or Less

Sulfur (S) may be an element inevitably contained in steel and decreases ductility and weldability of a steel sheet. In particular, when the content of sulfur (S) is greater than 0.02%, there is an increasing risk that the ductility and the weldability of the steel sheet are decreased. Therefore, the content of sulfur (S) is controlled to 0.02% or less. However, 0% is excluded in consideration of a decrease in productivity during steelmaking.

N: 0.02% or Less

Nitrogen (N) is an element having a solid-solution strengthening effect. However, when a content of nitrogen (N) is greater than 0.02%, there is an increasing risk that brittleness occurs. In addition, nitrogen (Ni) may bind with aluminum (Al) to precipitate an excessive amount of AlN, and thus, continuous casting quality may be deteriorated.

As a result, in the present disclosure, the content of nitrogen (N) is controlled to 0.02% or less. However, 0% is excluded in consideration of a decrease in productivity during steelmaking.

Al: 0.5% or Less (Excluding 0%)

Aluminum (Al) is an element suppressing formation of a carbide in ferrite to contribute to stabilization of retained austenite, and is added for deoxidation of steel.

When the content of aluminum (Al) is greater than 0.5%, tensile strength of steel may be decreased, and it may be difficult to produce a good slab through a reaction with a mold flux during casting. In addition, a surface oxide may be formed to deteriorate platability.

Therefore, in the present disclosure, the content of aluminum (Al) is controlled to, in detail, 0.5% or less. More advantageously, aluminum (Al) may be included in an amount of 0.3% or less, and 0% is excluded.

The steel sheet of the present disclosure may further include precipitate forming elements, other than the above-described alloying elements. The steel sheet of the present disclosure may include one selected from the group consisting of, in detail, titanium (Ti), niobium (Nb), vanadium (V), and molybdenum (Mo).

Ti: 0.1% or Less

Titanium (Ti) is a fine carbide forming element and contributes to improvement of yield strength and tensile strength. In addition, titanium (Ti), a nitride forming element, has an advantage of precipitating nitrogen (N) in steel as TiN and suppressing precipitation of AlN to reduce a risk of cracking during casting.

When the content of titanium (Ti) is greater than 0.1%, a coarse carbide may be precipitated, and strength and elongation may be deteriorated by a decrease in amount of carbon in steel. In addition, and nozzle clogging may occur during casting. As a result, the content of titanium (Ti) is controlled to, in detail, 0.1% or less.

Nb: 0.1% or Less

Niobium (Nb) is an element segregated in austenitic grain boundaries to suppress coarsening of austenite grains during annealing, and forms a fine carbide to contribute to improvement of strength.

When the content of niobium (Nb) is greater than 0.1%, a coarse carbide may be precipitated and the amount of carbon in steel may be reduced to cause a decrease in strength and elongation. Further, manufacturing costs may be increased.

Therefore, in the present disclosure, the content of niobium (Nb) is controlled to, in detail, 0.1% or less.

V: 0.2% or Less

Vanadium (V) is an element reacting with carbon or nitrogen to form a carbonitride and playing an important role in forming a fine precipitate at a low temperature to increase yield strength of steel.

When the content of vanadium (V) is greater than 0.2%, a coarse carbide may be precipitated and the amount of carbon in steel may be reduced to cause a decrease in strength and elongation. Further, manufacturing costs may be increased.

Therefore, in the present disclosure, the content of vanadium (V) is controlled to, in detail, 0.2% or less.

Mo: 1% or Less

Molybdenum (Mo) may be an element forming a carbide. When molybdenum (Mo) is added with titanium (Ti), niobium (Nb), vanadium (V), and the like, a size of a precipitate may be maintained in a fine size to improve yield strength and tensile strength.

When the content molybdenum (Mo) is greater than 1%, the above-mentioned effect may be saturated, and manufacturing costs may be increased.

Therefore, in the present disclosure, the content of molybdenum (Mo) is controlled to, in detail, 1% or less.

The remainder of the present disclosure may be iron (Fe). In the conventional steel producing process, since impurities which are not intended from raw materials or the surrounding environment may be inevitably incorporated, the impurities may not be excluded. All of these impurities are not specifically mentioned in this specification, as they are known to anyone skilled in the art of steel making.

The steel sheet of the present disclosure may further include silicon (Si) in amount of 1.0% or less.

Silicon (Si) is a solid-solution strengthening element, and may be added to increase strength of the steel sheet. However, when an excessive amount of silicon (Si) is added, an annealed oxide may be formed to deteriorate platability of the steel sheet. Therefore, silicon (Si) is added in amount of, in detail, 1.0% or less.

In addition to the above-described alloying elements, the steel sheet of the present disclosure may further include at least one of nickel (Ni), copper (Cu), and chromium (Cr) in amounts of 1% or less, 0.5% or less, and 1% or less, respectively, to improve mechanical properties, or the like.

The above nickel (Ni), copper (Cu), and chromium (Cr) may be elements contributing to stabilization of retained austenite, and may contribute to the stabilization of austenite by complicatedly acting in combination with C, Si, Mn, Al and the like.

Meanwhile, when the contents of nickel (Ni), copper (Cu), and chromium (Cr) are greater than 1%, 0.5%, and 1.0%, respectively, manufacturing costs may be excessively increased. Therefore, the above contents thereof are not preferable.

Since copper (Cu) may cause brittleness during hot-rolling, in further detail, copper (Cu) is added together with nickel (Ni).

The steel sheet of the present disclosure, satisfying the above-described alloy composition, includes, by volume fraction, in detail, retained austenite of 20% or more and annealed martensite of 60% or more as a microstructure.

When a phase fraction of the retained austenite is less than 20% or a phase fraction of the annealed martensite is less than 60%, it may be difficult to safely secure not only ultrahigh strength but also high ductility and hole expandability.

A balance structure, except for the retained austenite phase and the annealed martensite phase, may include an epsilon martensite phase and an alpha martensite phase. In this case, the structure is included in a volume fraction of, in detail, 20% or less (including 0%).

An annealed martensite phase of the present disclosure refers to a phase in a state in which when high-temperature austenite is cooled below a martensite transformation temperature Ms, dislocation of alpha martensite having a transformed body-centered cubic (BCC) structure is decreased by restoration during a heating process, but maintains an acicular shape because it is not recrystallized. The martensite phase has different properties depending on type thereof, and thus, an annealed martensite phase of the present disclosure is distinguished from the general martensite phase.

The steel sheet of the present disclosure includes one or more precipitates, among Ti, Nb, V, and Mo. Specifically, the steel sheet of the present disclosure includes $10^{13}/m^2$ or more of precipitates, each having a size of 30 nm or less.

When precipitates, each having a size larger than 30 nm, are present in a large amount, an effect of fine precipitates, resulting from coarsening of the precipitates, for example, a strength enhancement effect cannot be sufficiently obtained. Similarly, even when the number of the above-mentioned fine precipitates is less than $10^{13}/m^2$, the strength enhancement effect cannot also be obtained.

In the present disclosure, the precipitate includes at least one of a carbide, a nitride, and a complex carbonitride.

As described above, the steel sheet of the present disclosure may sufficiently obtain yield strength of 1000 MPa or more and tensile strength of 1250 MPa or more due to formation of a fine precipitate while sufficiently including a retained austenite phase and an annealed martensite phase as a microstructure.

In addition, high ductility may be secured. Therefore, when a product of tensile strength and elongation is 22000 MPa % or more, hole expandability (HER) is 10% or more, and thus, impact characteristics may be improved.

The steel sheet mentioned in the present disclosure may be not only a cold-rolled steel sheet but also a hot-dip galvanized steel sheet or an alloyed hot-dip galvanized steel sheet obtained by plating the cold-rolled steel sheet.

As an example, the hot-dip galvanized steel sheet may include a zinc plating layer or a zinc alloy plating layer provided on at least one surface of a cold-rolled steel sheet.

In addition, the alloyed hot-dip galvanized steel sheet may be produced by performing an alloying heat treatment on the hot-dip galvanized steel sheet.

Hereinafter, a method of manufacturing an ultrahigh-strength and high-ductility steel sheet having excellent cold formability, which may be another aspect of the present disclosure, will be described in detail.

First, a method of manufacturing a cold-rolled steel sheet according to the present disclosure will be described in detail below.

A cold-rolled steel sheet according to the present disclosure may be produced by preparing a steel slab, satisfying the above-mentioned alloy composition, and subjecting the prepared steel slab to a reheating operation, a hot-rolling operation, a coiling operation, a cold-rolling operation, and an annealing operation. Conditions of each of the processes will be described in detail below.

Steel Slab Reheating Operation

In the present disclosure, before the hot-rolling operation, a previously prepared steel slab may be preferably reheated to be homogenized. In this case, the steel slab may be preferably reheated to a temperature within a range of 1050° C. to 1300° C.

When the reheating temperature is less than 1050° C., a load may be rapidly increased during a subsequent hot-rolling operation. When the reheating temperature is higher than 1300° C., not only the energy cost may be increased, but also an amount of a surface scale may be increased to lead to loss of materials. In addition, when a large amount of manganese (Mn) is included, a liquid phase may be present.

Therefore, the reheating operation of the steel slab is preferably performed a temperature within a range of 1050° C. to 1300° C.

Hot-Rolling Operation

The reheated steel slab is preferably hot-rolled to produce a hot-rolled steel sheet. In this case, the hot-rolled steel sheet is preferably subjected to a finish hot-rolling operation at a temperature of 800° C. to 1000° C.

When the finish hot-rolling temperature is less than 800° C., a rolling load may be significantly increased. On the other hand, when the temperature is higher than 1000° C., a surface defect may be due to a scale and the lifespan of a rolling roll may be reduced.

Therefore, the finish hot-rolling operation is preferably performed at a temperature within a range of 800° C. to 1000° C.

Coiling Operation

The hot-rolled steel sheet produced by the above-mentioned operation is preferably coiled at a temperature within a range of 50° C. to 750° C.

When the coiling temperature is higher than 750° C., a scale of a surface of the steel sheet may be excessively formed to cause a defect, which may cause plating ability to be deteriorated. On the other hand, when the content of manganese (Mn) in the steel composition is 6% or more, hardenability may be significantly increased. Therefore, even when the steel sheet is cooled to room temperature after a hot-rolling coiling operation, ferrite transformation does not occur. Accordingly, a lower limit of the coiling temperature is not necessarily restricted. However, when the coiling temperature is lower than 50° C., cooling using cooling water spray may be required to decrease a temperature of the steel sheet to cause an unnecessary increase in a process cost. Thus, the coiling temperature is limited to, in detail, 50° C. or higher.

When a martensitic transformation initiation temperature is a room temperature or higher depending on the addition amount of manganese (Mn) in the component composition of steel, martensite may be formed at the room temperature. In this case, since strength of the hot-rolled sheet is significantly high due to a martensite structure, a heat treatment may be additionally performed before the cold-rolling operation to reduce a load during a subsequent cold-rolling operation. The heat treatment is performed at a temperature within a range of, in detail, 500° C. to 700° C. at which strength of a hot-rolled material may be reduced. In this case, heat treatment time is not necessarily limited and may be appropriately selected depending on a strength level of the hot-rolled steel sheet.

Pickling and Cold-Rolling Operations

An oxide layer is removed through a conventional pickling treatment of the hot-rolled steel sheet coiled depending on the above, and cold rolling is then preferably performed to secure a shape of the steel sheet and a thickness thereof required by a customer company.

During the cold rolling, a reduction ratio is not necessarily limited. However, the cold rolling is performed at a cold reduction ratio of, in detail, 15% or more to suppress formation of coarse ferrite crystal grains during recrystallization in a subsequent annealing process. In addition, when reduction ratio is less than 15%, it may be difficult to secure a target level of strength.

When the martensitic transformation initiation temperature is a room temperature or higher depending on the amount of manganese (Mn) added in steel, strength in the produced hot-rolled steel sheet is increased. Therefore, a heat treatment may be additionally performed before the above pickling and cold rolling operations are performed. This corresponds to a process for reducing a load during the cold rolling. The heat treatment is not necessarily limited as long as it is performed under a process condition in which the load can be reduced during the cold rolling. However, as an example, the heat treatment may be performed at a temperature of 600° C. for about 10 hours.

Annealing Operation

The present disclosure is to produce an ultrahigh-strength steel sheet having excellent strength, elongation, and hole expandability. To obtain such a steel sheet, it may be important to perform an annealing operation under conditions to be described later. In particular, the annealing operation is preferably performed step by step to complicatedly secure a retained austenite phase and an annealed martensite phase as an ultimate microstructure and to obtain target physical properties therefrom (see FIG. 1).

Primary Annealing

Primary annealing is preferably performed by maintaining the cold-rolled steel sheet, obtained by completing the maintained cold-rolling operation, at a temperature within a range of 750° C. to 870° C. for 10 seconds to 3600 seconds, cooling the cold-rolled steel sheet from a room temperature to a martensitic transformation initiation temperature (Ms), reheating the cooled steel sheet at a temperature within a range of Ms to 500° C., maintaining the reheated steel sheet for 10 seconds to 3600 seconds, and cooling the maintained steel sheet to a room temperature.

The initial maintenance temperature (750° C. to 870° C.) corresponds to an austenite single-phase region in a component system of the present disclosure, and a heat treatment is performed for, in detail, at least 10 seconds or longer in consideration of phase transformation kinetic during annealing. As the annealing time is increased, the phase may be close to an equilibrium phase to obtain a uniform structure. However, since manufacturing costs may be increased, the time of the heat treatment is limited to, in detail, 3600 seconds or less.

The steel sheet is preferably cooled at a temperature within a range of a room temperature to the MS after being annealed. Preferably, the cooled steel sheet is reheated at a temperature within a range of MS to 500° C. and is then maintained for 10 seconds to 3600 seconds.

When the steel sheet is annealed and then cooled to the MS or lower, the transformation amount of martensite is increased as a temperature is decreased. In addition, untransformed austenite may be present even at a room temperature. Therefore, a structure of the steel sheet may include martensite and austenite while cooling the steel sheet to the Ms or lower.

When the steel sheet is heated at the Ms or higher, solid solubility of carbon in martensite is low. Therefore, the carbon in the martensite may be distributed to surrounding austenite to improve stability of austenite. When the heated steel sheet is cooled to a room temperature again, a large amount of a retained austenite phase is formed and the balance includes martensite.

Since the carbon in the martensite should be diffused to austenite when the steel sheet, annealed and then cooled, is reheated to the Ms or higher, the steel sheet is preferably maintained for 10 seconds or longer. When the maintenance time is longer than 3600 seconds or the reheating temperature is higher 500° C., not only carbon redistribution between phases but also precipitation of cementite may occur, and thus, stability of austenite may be deteriorated and a retained austenite phase fraction may be reduced.

The Ms may be obtained from an equation below, and the room temperature refers to a temperature of about 25° C.

$$Ms=539-423[C]-30.4[Mn]-7.5[Si]+30[Al] \text{ (each element refers to a weight content)}$$

As a phase fraction of austenite retained through the above-described primary annealing process is increased, the amount of austenite ultimately retained in steel following subsequent secondary annealing may be increased to safely secure target physical properties.

Secondary Annealing

The primarily annealed and cooled cold-rolled steel sheet is annealed, in detail, within a temperature range in a two-phase region and is secondarily annealed, in further detail, at a temperature within a range of 550° C. to 750° C. for 10 seconds to 3600 seconds.

When annealing is performed in a two-phase region, elements such as carbon (C) and manganese (Mn) are enriched in austenite to improve stability of the austenite and the austenite is retained at a room temperature. When strain is applied thereto, while transforming the retained austenite into martensite, necking of the steel sheet is delayed to contribute to improvement of elongation and strength.

When the secondary annealing is performed at a temperature within a range of 550° C. to 750° C., reversed transformation of austenite occurs from a structure, obtained after the primary annealing, to increase a fraction of the austenite.

In this case, a heat treatment is preferably performed for at least 10 seconds in consideration of a phase transformation kinetic. As the annealing time is increased, the phase becomes may be close to an equilibrium phase to obtain a uniform structure. However, since manufacturing costs may be increased the structure may be coarsened to deteriorate physical properties, the time of the heat treatment is limited to, in detail, 3600 seconds or less.

According to the above description of the present disclosure, the cold-rolled steel sheet, annealed step by step, may be plated to be manufactured as a plated steel sheet.

In this case, an electroplating method, a hot-dip galvanizing method, or an alloying hot-dip galvanizing method may be used. As an example, the cold-rolled steel sheet is dipped in a zinc plating bath to manufacture a hot-dip galvanized steel sheet. Further, the hot-dip galvanized steel sheet may be alloying-heat-treated to manufacture an alloyed hot-dip galvanized steel sheet.

Conditions for the above-mentioned plating treatment are not necessarily limited, and the plating treatment may be performed under conditions to be generally used.

Hereinafter, the present disclosure will be described in more detail with reference to Examples. It should be noted, however, that the embodiments described below are for the purpose of illustrating the present disclosure and are not intended to limit the scope of the present disclosure, since the scope of the present disclosure is determined by the matters described in the claims and matters able to be reasonably deduced therefrom.

MODE FOR INVENTION

Example

Steel, having a component composition of Table 1, was vacuum-melted from 30 kg of ingots, and was then maintained for an hour at a temperature of 1200° C. Then, finish hot rolling was performed at 900° C. to manufacture a hot-rolled steel sheet. Then, the hot-rolled steel sheet was charged in a furnace pre-heated at 600° C. and maintained for an hour, and hot rolled coiling was simulated by furnace-cooling.

In the case of a type of steel containing a large amount of manganese (Mn), the strength of the hot-rolled steel sheet is high. Therefore, before cold rolling, a heat treatment may be additionally performed to reduce a load during subsequent cold rolling. When a martensitic transformation initiation temperature is a room temperature or higher depending on the amount of added manganese (Mn), a large amount of martensite may be formed in the hot-rolled steel sheet. In this case, strength of the hot-rolled sheet is significantly increased due to a martensitic structure. Accordingly, each specimen cooled based on the above was heat-treated at 600° C. for 10 hours.

Then, each specimen was cooled to a room temperature and was then pickled and cold-rolled to manufacture a cold-rolled steel sheet. The cold rolling was performed at a cold reduction ratio of 30% or more. Each of the manufactured cold-rolled steel sheets was annealed step by step under conditions listed in Table 2.

Mechanical properties were measured for each specimen prepared as described above, and results obtained by observing a microstructure and measuring a fraction of each structure are listed in Table 3.

The mechanical properties were measured by performing a tensile test using a universal tensile testing machine after processing tensile specimens in accordance with JIS5 standard.

A microstructure fraction was obtained by measuring an ultimate annealed structure using an XRD to obtain a fraction between phases of retained austenite of FCC, martensite of BCC, and epsilon-martensite of HCP. In addition, since both annealed martensite and alpha-martensite have a BCC structure, the two phases were distinguished by observation using an electron scanning microscope.

TABLE 1

| Type of Steel | Alloy Composition (wt %) | | | | | | | | | | | Ms (° C.) |
|---|---|---|---|---|---|---|---|---|---|---|---|---|
| | C | Mn | Si | Al | Mo | Ti | Nb | V | P | S | N | |
| IS1 | 0.12 | 7 | 0 | 0.02 | 0.3 | 0.08 | 0 | 0 | 0.008 | 0.004 | 0.006 | 275 |
| IS2 | 0.12 | 7 | 0 | 0.03 | 0.3 | 0.10 | 0 | 0 | 0.009 | 0.006 | 0.005 | 275 |
| IS3 | 0.12 | 7 | 0 | 0.04 | 0.5 | 0.08 | 0 | 0 | 0.007 | 0.009 | 0.006 | 275 |
| IS4 | 0.12 | 7 | 0 | 0.03 | 0.3 | 0.08 | 0.04 | 0 | 0.010 | 0.010 | 0.004 | 275 |
| IS5 | 0.14 | 7 | 0 | 0.05 | 0.3 | 0.06 | 0.04 | 0 | 0.009 | 0.009 | 0.007 | 267 |
| IS6 | 0.14 | 7 | 0 | 0.06 | 0.3 | 0.08 | 0.04 | 0 | 0.008 | 0.008 | 0.006 | 267 |
| IS7 | 0.14 | 7 | 0 | 0.02 | 0.3 | 0.10 | 0.04 | 0 | 0.006 | 0.004 | 0.005 | 267 |
| IS8 | 0.12 | 8 | 0 | 0.06 | 0.25 | 0.06 | 0 | 0 | 0.007 | 0.005 | 0.007 | 245 |
| IS9 | 0.12 | 9 | 0.5 | 0.03 | 0.25 | 0.04 | 0 | 0.06 | 0.010 | 0.008 | 0.007 | 211 |
| CS1 | 0.12 | 7 | 0 | 0.02 | 0 | 0 | 0 | 0 | 0.008 | 0.006 | 0.004 | 275 |
| CS2 | 0.12 | 5 | 0 | 0.03 | 0.3 | 0.08 | 0.04 | 0 | 0.007 | 0.005 | 0.006 | 336 |

IS: Inventive Steel/CS : Comparative Steel

TABLE 2

| Type of Steel | Primary Annealing | | | | | Secondary Annealing | | Classification |
|---|---|---|---|---|---|---|---|---|
| | Annealing Temperature (° C.) | Annealing Time (Sec) | Cooling Temperature (° C.) | Reheating Temperature (° C.) | Reheating Time (Sec) | Annealing Temperature (° C.) | Annealing Time (Sec) | |
| IS1 | 820 | 120 | 150 | 300 | 300 | 620 | 120 | Inventive Example 1 |
| | 820 | 120 | 150 | 300 | 300 | 640 | 120 | Inventive Example 2 |
| | 820 | 120 | 180 | 300 | 300 | 640 | 120 | Inventive Example 3 |
| | 820 | 120 | 400 | 400 | 300 | 600 | 120 | Comparative Example 1 |
| | 820 | 120 | 400 | 400 | 300 | 640 | 120 | Comparative Example 2 |
| IS2 | 820 | 120 | 150 | 300 | 300 | 640 | 120 | Inventive Example 4 |
| | 820 | 120 | 180 | 300 | 300 | 620 | 120 | Inventive Example 5 |
| | 820 | 120 | 180 | 300 | 300 | 640 | 120 | Inventive Example 6 |
| | 820 | 120 | 400 | 400 | 300 | 620 | 120 | Comparative Example 3 |
| | 820 | 120 | 400 | 400 | 300 | 640 | 120 | Comparative Example 4 |
| IS3 | 820 | 120 | 150 | 300 | 300 | 620 | 120 | Inventive Example 7 |
| | 820 | 120 | 150 | 300 | 300 | 640 | 120 | Inventive Example 8 |
| | 820 | 120 | 180 | 300 | 300 | 640 | 120 | Inventive Example 9 |
| | 820 | 120 | 400 | 400 | 300 | 600 | 120 | Comparative Example 5 |
| | 820 | 120 | 400 | 400 | 300 | 620 | 120 | Comparative Example 6 |
| IS4 | 820 | 120 | 150 | 300 | 300 | 620 | 120 | Inventive Example 10 |
| | 820 | 120 | 180 | 300 | 300 | 640 | 120 | Inventive Example 11 |
| | 820 | 120 | 400 | 400 | 300 | 620 | 120 | Comparative Example 7 |
| | 820 | 120 | 400 | 400 | 300 | 640 | 120 | Comparative Example 8 |
| IS5 | 820 | 120 | 150 | 300 | 300 | 620 | 120 | Inventive Example 12 |
| | 820 | 120 | 180 | 300 | 300 | 620 | 120 | Inventive Example 13 |
| | 820 | 120 | 180 | 300 | 300 | 640 | 120 | Inventive Example 14 |
| | 820 | 120 | 400 | 400 | 300 | 620 | 120 | Comparative Example 9 |
| | 820 | 120 | 400 | 400 | 300 | 640 | 120 | Comparative Example 10 |
| IS6 | 820 | 120 | 150 | 300 | 300 | 600 | 120 | Inventive Example 15 |
| | 820 | 120 | 150 | 300 | 300 | 620 | 120 | Inventive Example 16 |
| | 820 | 120 | 180 | 300 | 300 | 620 | 120 | Inventive Example 17 |
| | 820 | 120 | 400 | 400 | 300 | 620 | 120 | Comparative Example 11 |
| | 820 | 120 | 400 | 400 | 300 | 640 | 120 | Comparative Example 12 |
| IS7 | 820 | 120 | 150 | 300 | 300 | 620 | 120 | Inventive Example 18 |
| | 820 | 120 | 180 | 300 | 300 | 620 | 120 | Inventive Example 19 |
| | 820 | 120 | 180 | 300 | 300 | 640 | 120 | Inventive Example 20 |
| | 820 | 120 | 400 | 400 | 300 | 640 | 120 | Comparative Example 13 |
| IS8 | 820 | 120 | 210 | 300 | 300 | 620 | 120 | Inventive Example 21 |
| | 820 | 120 | 180 | 300 | 300 | 640 | 120 | Inventive Example 22 |
| | 820 | 120 | 150 | 300 | 300 | 600 | 120 | Inventive Example 23 |
| IS9 | 820 | 120 | 180 | 300 | 300 | 600 | 120 | Inventive Example 24 |
| | 820 | 120 | 150 | 300 | 300 | 600 | 120 | Inventive Example 25 |
| | 820 | 120 | 150 | 600 | 300 | 600 | 120 | Comparative Example 14 |
| | 820 | 120 | 150 | 300 | 300 | 780 | 120 | Comparative Example 15 |
| CS1 | 820 | 120 | 150 | 300 | 300 | 620 | 120 | Comparative Example 16 |
| | 820 | 120 | 150 | 300 | 300 | 640 | 120 | Comparative Example 17 |
| CS2 | 820 | 120 | 150 | 300 | 300 | 620 | 120 | Comparative Example 18 |
| | 820 | 120 | 150 | 300 | 300 | 640 | 120 | Comparative Example 19 |

IS: Inventive Steel / CS: Comparative Steel

TABLE 3

| Classification | Microstructure (vol %) Annealed Martensit | Microstructure (vol %) Retained Austenite | Microstructure (vol %) Others | Number of Precipitates (/m²) | Mechanical Properties YS (MPa) | Mechanical Properties Ts (MPa) | Mechanical Properties El (%) | Mechanical Properties TS × El (MPa%) | Mechanical Properties HER (%) |
|---|---|---|---|---|---|---|---|---|---|
| Inventive Example 1 | 68 | 29 | 3 | $9 \times 10^{13}$ | 1057 | 1304 | 19 | 24776 | 14 |
| Inventive Example 2 | 65 | 31 | 4 | $1 \times 10^{14}$ | 1014 | 1320 | 20 | 26400 | 11 |
| Inventive Example 3 | 70 | 25 | 5 | $1 \times 10^{14}$ | 1158 | 1267 | 20 | 25340 | 12 |
| Comparative Example 1 | 85 | 13 | 2 | $7 \times 10^{13}$ | 1243 | 1207 | 9 | 10863 | 22 |
| Comparative Example 2 | 78 | 21 | 1 | $9 \times 10^{13}$ | 1251 | 1206 | 23 | 27738 | 13 |
| Inventive Example 4 | 68 | 29 | 3 | $2 \times 10^{14}$ | 1030 | 1342 | 20 | 26840 | 12 |
| Inventive Example 5 | 73 | 23 | 4 | $3 \times 10^{14}$ | 1226 | 1267 | 17 | 21539 | 17 |
| Inventive Example 6 | 72 | 25 | 3 | $2 \times 10^{14}$ | 1178 | 1290 | 21 | 27090 | 15 |
| Comparative Example 3 | 83 | 15 | 2 | $3 \times 10^{14}$ | 1369 | 1219 | 14 | 17066 | 21 |
| Comparative Example 4 | 76 | 19 | 5 | $4 \times 10^{14}$ | 1275 | 1212 | 22 | 26664 | 15 |
| Inventive Example 7 | 71 | 26 | 3 | $3 \times 10^{14}$ | 1101 | 1358 | 17 | 23086 | 18 |
| Inventive Example 8 | 66 | 32 | 2 | $5 \times 10^{14}$ | 1012 | 1371 | 20 | 27420 | 23 |
| Inventive Example 9 | 74 | 23 | 3 | $2 \times 10^{14}$ | 1283 | 1302 | 22 | 28644 | 17 |
| Comparative Example 5 | 83 | 13 | 4 | $4 \times 10^{14}$ | 1383 | 1269 | 7 | 8883 | 23 |
| Comparative Example 6 | 83 | 15 | 2 | $3 \times 10^{14}$ | 1387 | 1257 | 11 | 13827 | 21 |
| Inventive Example 10 | 63 | 32 | 5 | $1 \times 10^{14}$ | 1085 | 1306 | 18 | 23508 | 15 |
| Inventive Example 11 | 71 | 26 | 3 | $3 \times 10^{14}$ | 1177 | 1257 | 21 | 26397 | 13 |
| Comparative Example 7 | 85 | 13 | 2 | $1 \times 10^{14}$ | 1319 | 1202 | 9 | 10818 | 20 |
| Comparative Example 8 | 76 | 19 | 5 | $2 \times 10^{14}$ | 1248 | 1193 | 22 | 26246 | 15 |
| Inventive Example 12 | 65 | 31 | 4 | $9 \times 10^{13}$ | 1045 | 1333 | 18 | 23994 | 15 |
| Inventive Example 13 | 70 | 25 | 5 | $9 \times 10^{13}$ | 1237 | 1270 | 18 | 22860 | 18 |
| Inventive Example 14 | 72 | 25 | 3 | $1 \times 10^{14}$ | 1161 | 1280 | 22 | 28160 | 12 |
| Comparative Example 9 | 80 | 17 | 3 | $8 \times 10^{13}$ | 1325 | 1227 | 19 | 23313 | 20 |
| Comparative Example 10 | 74 | 21 | 5 | $2 \times 10^{14}$ | 1243 | 1218 | 24 | 29232 | 15 |
| Inventive Example 15 | 71 | 25 | 4 | $1 \times 10^{14}$ | 1022 | 1354 | 17 | 23018 | 15 |
| Inventive Example 16 | 68 | 29 | 3 | $2 \times 10^{14}$ | 1038 | 1336 | 17 | 22712 | 12 |
| Inventive Example 17 | 75 | 21 | 4 | $1 \times 10^{14}$ | 1264 | 1257 | 18 | 22626 | 19 |
| Comparative Example 11 | 78 | 17 | 5 | $2 \times 10^{14}$ | 1327 | 1221 | 18 | 21978 | 20 |
| Comparative Example 12 | 78 | 19 | 3 | $3 \times 10^{14}$ | 1245 | 1218 | 21 | 25578 | 11 |
| Inventive Example 18 | 64 | 33 | 3 | $5 \times 10^{14}$ | 1058 | 1339 | 17 | 22763 | 14 |
| Inventive Example 19 | 70 | 26 | 4 | $2 \times 10^{14}$ | 1304 | 1269 | 18 | 22842 | 17 |
| Inventive Example 20 | 65 | 30 | 5 | $7 \times 10^{14}$ | 1248 | 1266 | 21 | 26586 | 11 |
| Comparative Example 13 | 78 | 19 | 3 | $6 \times 10^{14}$ | 1267 | 1231 | 25 | 30775 | 6 |
| Inventive Example 21 | 68 | 27 | 5 | $5 \times 10^{13}$ | 1140 | 1263 | 26 | 32838 | 16 |
| Inventive Example 22 | 67 | 30 | 3 | $3 \times 10^{13}$ | 1015 | 1335 | 25 | 33375 | 13 |
| Inventive Example 23 | 60 | 36 | 4 | $3 \times 10^{13}$ | 1033 | 1336 | 23 | 30728 | 16 |
| Inventive Example 24 | 62 | 32 | 6 | $2 \times 10^{13}$ | 1080 | 1356 | 18 | 24408 | 10 |
| Inventive Example 25 | 51 | 39 | 10 | $1 \times 10^{13}$ | 1025 | 1367 | 17 | 23239 | 10 |
| Comparative Example 14 | 79 | 16 | 5 | $1 \times 10^{13}$ | 1069 | 1306 | 16 | 20896 | 6 |
| Comparative Example 15 | 5 | 12 | 93 | $1 \times 10^{10}$ | 750 | 1630 | 10 | 16300 | 3 |
| Comparative Example 16 | 75 | 21 | 4 | 0 | 975 | 1196 | 22 | 26312 | 12 |
| Comparative Example 17 | 75 | 23 | 2 | 0 | 856 | 1235 | 19 | 23465 | 9 |
| Comparative Example 18 | 86 | 14 | 0 | $8 \times 10^{13}$ | 812 | 1065 | 19 | 20235 | 13 |
| Comparative Example 19 | 84 | 16 | 0 | $9 \times 10^{13}$ | 790 | 1099 | 17 | 18683 | 9 |

(In Table 3, the number of precipitates is measured by selecting only precipitates, each having a size of 30 nm or less. In Table 3, YS denotes yield strength, TS denotes tensile strength, El denotes elongation, and HER denotes hole expandability.)

As shown in Tables 1 to 3, in Inventive Examples 1 to 25, satisfying the alloy composition and the manufacturing method proposed in the present disclosure, yield strength was 1000 MPa or more, tensile strength was ultrahigh strength of 1250 MPa or more, and elongation was excellent. Thus, the product of tensile strength and elongation may be secured to be 22,000 MPa % or more, and hole expandability may also be secured to be 10% or more.

This is because, after annealing and cooling, reheating was performed at a temperature within a specific range during the primary annealing to increase a fraction of ultimately retained austenite after secondary annealing.

Therefore, it can be confirmed that the steel sheet according to the present disclosure is significantly advantageous as a cold press forming steel sheet, capable of replacing an existing hot press forming steel sheet.

Meanwhile, even when Examples satisfied the component composition of the present disclosure but preparation conditions did not satisfy the present disclosure, it was difficult to secure target mechanical properties.

Specifically, when a cooling termination temperature during cooling after annealing was higher than MS in a primary annealing process, for example, when a reheating process was not performed after annealing and cooling (Comparative Examples 1 to 13), the fraction of the ultimately retained austenite is low. Therefore, target strength, elongation, or hole expandability was poor.

In Comparative Example 14 in which a reheating temperature during the primary annealing process was significantly high, hole expandability was poor because a retained austenite phase was not sufficiently formed. In Comparative Example 15 in which an annealing temperature during the secondary annealing heat process was significantly high, strength and the hole expandability were poor because an annealed martensite phase and a retained austenite phase were not sufficiently formed.

In the case of Comparative Examples 16 and 17, in which preparation conditions satisfied the present disclosure but precipitation hardening elements were not added, and Comparative Examples 18 and 19, in which the content of manganese (Mn) was insufficient, a target level of strength could not be secured.

FIG. 2 is a graph showing a result obtained by measuring a fraction of retained austenite depending on a cooling temperature after annealing when performing primary annealing using Inventive Steel 8. As can be seen from FIG. 2, as a cooling temperature during cooling after annealing is decreased to be MS or less, a fraction of retained austenite is increased (in FIG. 2, cases of cooling temperatures of 250° C., 300° C., and 400° C. were not listed in Table 2 and Table 3).

FIG. 3 is an image of an ultimate microstructure of Inventive Example 13. As can be seen from FIG. 3, precipitates were formed in annealed martensite (a) and retained austenite (b).

The invention claimed is:

1. An ultrahigh-strength and high-ductility steel sheet having excellent cold formability, comprising, by weight percentage (wt %), carbon (C): 0.1% to 0.3%, manganese (Mn): 6% to 10%, phosphorus (P): 0.05% or less, sulfur (S): 0.02% or less, nitrogen (N): 0.02% or less, aluminum (Al): 0.5% or less (excluding 0%), at least one selected from the group consisting of titanium (Ti): 0.1% or less, niobium (Nb): 0.1% or less, vanadium (V): 0.2% or less, and molybdenum (Mo): 1% or less, a remainder of iron (Fe), and other unavoidable impurities, wherein a microstructure comprises retained austenite having a volume fraction of 20% or more and annealed martensite having a volume fraction of 60% or more, and the steel sheet contains $10^{13}/m^2$ or more precipitates, each having a size of 30 nm or less.

2. The steel sheet of claim 1, further comprising silicon (Si) in an amount of 1.0 wt % or less.

3. The steel sheet of claim 1, further comprising both epsilon martensite and alpha martensite in an amount of a total volume fraction of more than 0% and up to 20%.

4. The steel sheet of claim 1, wherein the precipitate is one or more of a carbide, a nitride, and a complex carbonitride, and the precipitate contains at least one of titanium (Ti), niobium (Nb), vanadium (V), and molybdenum (Mo).

5. The steel sheet of claim 1, further comprising at least one selected from the group consisting of nickel (Ni): 1 wt % or less, copper (Cu): 0.5 wt % or less, and chromium (Cr): 1 wt % or less.

6. The steel sheet of claim 1, wherein the steel sheet has yield strength of 1000 MPa or more and tensile strength of 1250 MPa or more, a product of the tensile strength and elongation is 22000 MPa % or more, and hole expandability (HER) is 10% or more.

7. The steel sheet of claim 1, wherein the steel sheet is one of a cold-rolled steel sheet, a hot-dip galvanized steel sheet, and an alloying hot-dip galvanized steel sheet.

* * * * *